United States Patent
Jain et al.

(10) Patent No.: US 12,554,245 B2
(45) Date of Patent: Feb. 17, 2026

(54) MACHINE LEARNING BASED RAPID PARAMETER DEVELOPMENT FOR ADDITIVE MANUFACTURING AND RELATED METHODS

(71) Applicant: Baker Hughes Oilfield Operations LLC, Houston, TX (US)

(72) Inventors: Jayesh Jain, The Woodlands, TX (US); Thomas Dobrowolski, The Woodlands, TX (US); Mackenzie Dreese, Oklahoma City, OK (US); Vaibhavi Rajendran, Tamil Nadu (IN); Chad Yates, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 457 days.

(21) Appl. No.: 18/157,221

(22) Filed: Jan. 20, 2023

(65) Prior Publication Data
US 2024/0094702 A1    Mar. 21, 2024

(30) Foreign Application Priority Data
Sep. 15, 2022    (IN) .............................. 202211052764

(51) Int. Cl.
*B33Y 50/02*    (2015.01)
*B22F 10/80*    (2021.01)
(Continued)

(52) U.S. Cl.
CPC .......... *G05B 19/4099* (2013.01); *B22F 10/80* (2021.01); *B29C 64/386* (2017.08);
(Continued)

(58) Field of Classification Search
CPC ..................................................... B33Y 50/02
See application file for complete search history.

(56) References Cited

U.S. PATENT DOCUMENTS

2015/0123320 A1 * 5/2015 Joyce .................... B29C 64/393
425/150
2016/0236414 A1    8/2016 Reese et al.
(Continued)

FOREIGN PATENT DOCUMENTS

EP          3354381 A1 *  8/2018  .............. B22F 10/28
WO     2021/062536 A1    4/2021
(Continued)

OTHER PUBLICATIONS

International Search Report for Application No. PCT/US2023/073946 dated Jan. 11, 2024, 3 pages.
(Continued)

*Primary Examiner* — Suresh Suryawanshi
(74) *Attorney, Agent, or Firm* — TraskBritt (57) ABSTRACT

An additive manufacturing system may include an additive manufacturing device and a process map generation system. The process map generation system may generate an operational process map responsive to mathematical simulations of an additive manufacturing device, cause the additive manufacturing device to print a plurality of test structures responsive to the operational process map, detect one or more defects in each of the plurality of test structures, automatically update the operational process map responsive to the defects, and modify one or more operating parameters of the additive manufacturing device responsive to the updated operational process map.

20 Claims, 8 Drawing Sheets

(51) Int. Cl.
*B29C 64/386* (2017.01)
*B33Y 50/00* (2015.01)
*G05B 13/02* (2006.01)
*G05B 19/4099* (2006.01)

(52) U.S. Cl.
CPC .......... *B33Y 50/00* (2014.12); *G05B 13/0265* (2013.01); *G05B 2219/49023* (2013.01)

(56) References Cited

U.S. PATENT DOCUMENTS

| | | | |
|---|---|---|---|
| 2018/0356778 A1* | 12/2018 | Acharya | G05B 17/02 |
| 2019/0227525 A1 | 7/2019 | Mehr et al. | |
| 2019/0283333 A1 | 9/2019 | Hwang et al. | |
| 2019/0337232 A1* | 11/2019 | Prabha Narra | G06F 30/23 |
| 2020/0184617 A1 | 6/2020 | Perron et al. | |
| 2021/0299754 A1* | 9/2021 | Aoyagi | B29C 64/393 |

FOREIGN PATENT DOCUMENTS

| | | |
|---|---|---|
| WO | 2021/102047 A1 | 5/2021 |
| WO | WO-2022159344 A1 * | 7/2022 |
| WO | WO-2022194960 A1 * | 9/2022 |

OTHER PUBLICATIONS

International Written Opinion for Application No. PCT/US2023/073946 dated Jan. 11, 2024, 5 pages.

* cited by examiner

FIG. 8

MACHINE LEARNING BASED RAPID PARAMETER DEVELOPMENT FOR ADDITIVE MANUFACTURING AND RELATED METHODS

TECHNICAL FIELD

Embodiments of the present disclosure relate generally to methods and systems for developing operating parameters for additive manufacturing devices.

BACKGROUND

Three-dimensional additive manufacturing (or "printing") is increasingly used in a variety of industries for its ability to create complex three-dimensional structures from a variety of materials. For example, additive manufacturing devices are capable of producing structures formed from a variety of plastics and metals based on computer generated three-dimensional images. Various methods have been developed to perform additive manufacturing, each requiring unique operating parameters depending on the method used. However, development of these operating parameters requires intensive trial and error and conventional methods are slow and inefficient.

BRIEF SUMMARY

Some embodiments of the present disclosure include an additive manufacturing system. The additive manufacturing system may include an additive manufacturing device and a process map generation system. The process map generation system may include: at least one processor, a memory device that may store data representative of a plurality of mathematical simulations of an operation of the additive manufacturing device, and at least one non-transitory computer-readable storage medium storing instructions thereon that, when executed by the at least one processor, cause the process map generation system to: obtain an operational process map defining operating parameters of the additive manufacturing device, cause the additive manufacturing device to print a plurality of test structures responsive to the operational process map where each test structure of the plurality of test structures is printed based on at least one different operational parameter relative to other test structures of the plurality of test structures, detect one or more defects in each of the plurality of test structures, automatically update the operational process map responsive to the one or more defects, and modify one or more operating parameters of the additive manufacturing device responsive to the operational process map.

Further embodiments of the present disclosure include a method for determining operating parameters of an additive manufacturing device. The method may include generating an operational process map based on a plurality of pre-calculated mathematical simulations of an operation of an additive manufacturing device, printing a plurality of test structures via the additive manufacturing device, each test structure of the plurality of test structures printed using at least one different operating parameter relative to other test structures of the plurality of test structures, detecting one or more defects in each test structure of the plurality of test structures, automatically updating the operational process map responsive to the one or more defects, and modifying one or more operating parameters of the additive manufacturing device responsive to the updated operational process map.

Further embodiments of the present disclosure may include a non-transitory computer-readable medium storing instructions thereon that, when executed by at least one processor, cause the at least one processor to perform steps. The steps may include: generating an operational process map based on a plurality of pre-calculated mathematical simulations of an operation of an additive manufacturing device, printing a plurality of test structures via the additive manufacturing device, each test structure of the plurality of test structures printed using at least one different operating parameter relative to other test structures of the plurality of test structures, obtaining one or more Computed Tomography (CT) images of each of the plurality of test structures via a CT imager, extracting one or more features from the one or more CT images, classifying one or more defects represented in the CT images into one or more defect types based, at least in part, on one or more features, automatically updating the operational process map responsive to the one or more defect types, and modifying one or more operating parameters of the additive manufacturing device responsive to the operational process map.

BRIEF DESCRIPTION OF THE SEVERAL VIEWS OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Three-dimensional additive manufacturing (AM), also termed "printing," involves the spreading of a layer of particulate material and then binding selected portions of the particulate layer together, for example by laser powder bed fusion, activating adhesive material coating the particles, or jetting an adhesive binder fluid onto the particulate layer. This sequence is repeated for additional particulate layers until a desired structure has been constructed. The material making up the particulate layer is often referred to as the "build material" or "the build material powder" and a coating or jetted fluid is often referred to as a "binder," or in some cases, an "activator." For example, laser powder bed fusion involves using a laser to iteratively melt layers of powder (often metallic) layer by layer to form geometric structures. Post-processing of the three-dimensionally printed part is often required in order to strengthen and/or densify the part.

Various methods may be used to supply each new powder layer for three-dimensional printing. For example, some three-dimensional printers have a powder supply platform that contains powder supported upon a vertically indexable platform and use a counter-rotating roller or a recoater to transfer a predetermined amount of powder from the top of the powder supply platform to the top of a build platform. This method is typical for laser powder bed fusion. Some other three-dimensional printers utilize a traveling dispenser nozzle to dispense each new layer of powder and a traveling blade to smooth the newly deposited layer.

The process of AM may be difficult as there are potentially hundreds of variables to consider that, if not properly calibrated, may cause defects such as keyholing, vertical or horizontal lack of fusion (LOF), balling, surface closed porosity, etc., in the article being manufactured. As a specific example, in an AM device configured to perform laser bed fusion, keyholing may occur when the laser is moving too slowly across the powder material and/or if the laser directs too much heat to the powder. This may cause a keyhole-shaped cavity at the bottom of the melt pools created by the laser, which may form pores or bubbles at the bottom of the keyhole. These pores or bubbles may then be trapped in the solidifying melt pools, compromising the structural integrity of the structure being manufactured. In addition to the speed and intensity of the laser, other parameters of a laser bed fusion AM device may cause keyholing or other defects such as hatch spacing (e.g., spacing between each pass of the laser over the powder material), powder layer thickness, the area of the laser, the type of material being used for the powder, etc. Moreover, these parameters often must be changed or adapted when using new materials, different AM processes, different machines, different powders, or even different portions of the print itself. Furthermore, the sheer number of parameters interacting with and influencing one another over the course of the manufacturing process may make it difficult to ascertain root causes, making it slow and expensive to optimize the parameters to avoid future defects.

To calculate operational parameters for an AM device or process, conventional methods include building an operational process map to aid in selecting parameter values for the AM device or process. Conventional methods typically limit an operational process map to a small number of parameters, and may require manually performing single track tests and large design of experiment (DOE) prints to evaluate each parameter type individually. This conventional process may also involve a person performing manual defect type analysis on Computed Tomography (CT) scans of printed test structures and then changing a parameter of the process map of the AM device and performing additional prints to see if the defect was corrected. This conventional process is both slow and expensive as it may take months to build a process map that will still be limited to only a small number of parameters. Thus, conventional process map development for AM devices is slow, expensive, and may not account for a large number of parameters that may contribute to causing defects in a print build.

In accordance with this disclosure, an additive manufacturing system may use machine-learning for automated process map generation. For example, the additive manufacturing system may automatically generate and/or update an operational process map for an additive manufacturing device, which may enable faster development of an operational process map as well as allowing for a more comprehensive number of parameters to be taken into account without the labor and time intensive limitations of conventional methods. Moreover, the additive manufacturing system may allow for automatic classification of defects detected in a plurality of printed test structures, which may allow for more robust an accurate defect detection as well as enabling faster determination of a root cause of the defects to improve parameter development of the operational process map.

Figure 1:
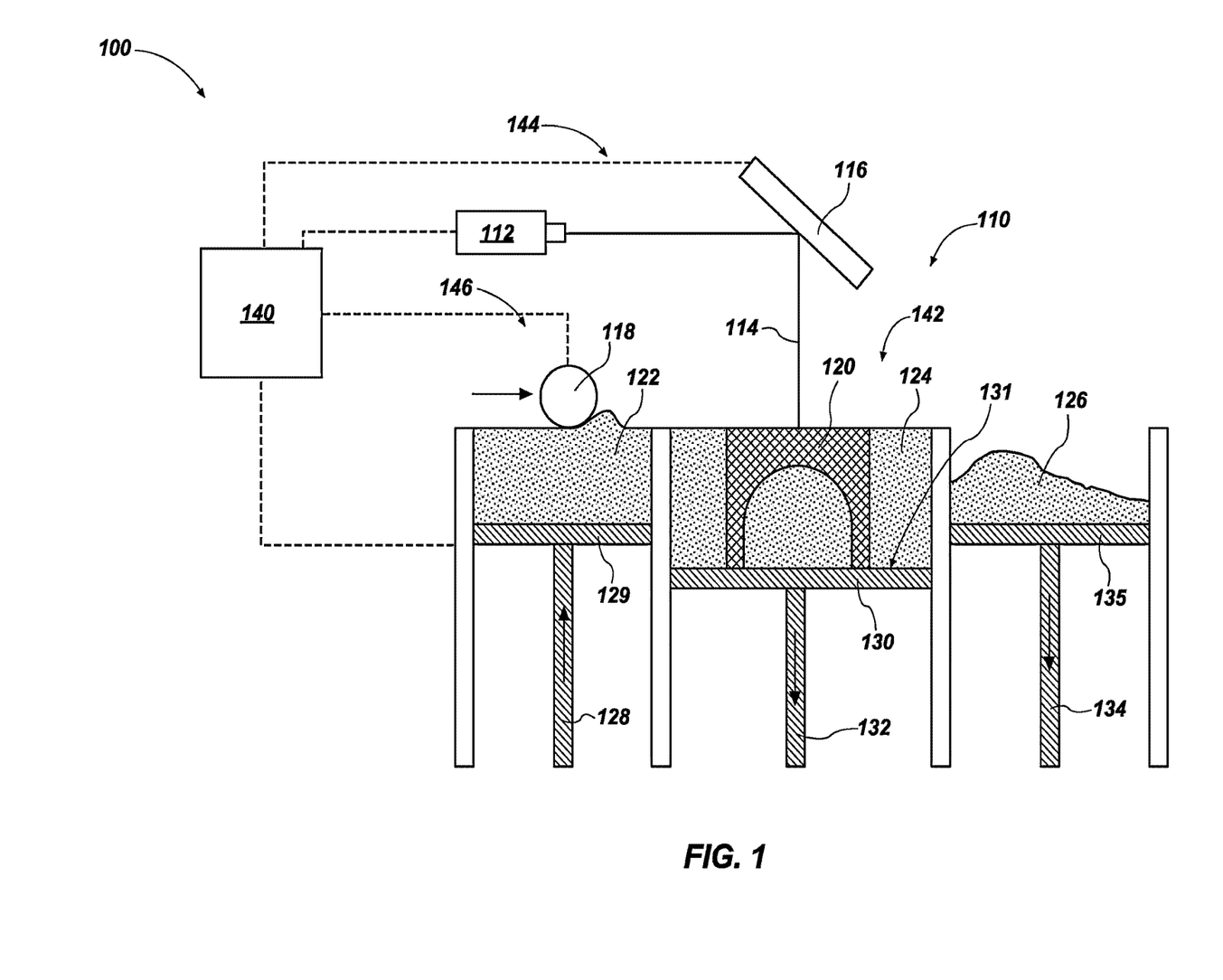
FIG. 1 is a schematic view of an example additive manufacturing system according to one or more embodiments of the present disclosure.

FIG. 1 is a schematic view of an additive manufacturing system 100 according to one or more embodiments of the present disclosure. In some embodiments, the additive manufacturing system 100 may include a controller 140 and an additive manufacturing device 110. The additive manufacturing device may include a build assembly 142, a heat applicator assembly 144, and a powder supply assembly 146. Each of the build assembly 142, the heat applicator assembly 144, and the powder supply assembly 146 may be operably coupled to the controller 140. The build assembly 142 may include a build platform 130 and a build plate 131 disposed on an upper surface of the build platform 130 and for supporting a build powder 124 and an article 120 (e.g., an additively manufactured article or "print build") to be constructed. In some embodiments, one or more fasteners removably secure the build plate 131 to the build platform 130.

In some embodiments, the build platform 130 may include a build platform piston 132, which translates in a vertical direction (e.g., a vertical Z axis) during formation of article 120 as a result of a printing process. For example, the build platform 130 may include any conventional build platform known in the art.

The powder supply assembly 146 may include a powder supply platform 129, a powder supply 122, and a material applicator 118. In some embodiments, the powder supply platform 129 may include a powder supply piston 128, which translates in the vertical direction (e.g., the vertical Z axis) to translate the powder supply platform 129 in the vertical direction. Moreover, powder supply 122 may be disposed on an upper surface of the powder supply platform 129. For example, the powder supply platform 129 may be configured to translate upward in the vertical direction during a process of printing an article (e.g., article 120), and the material applicator 118 (e.g., a powder roller, a powder blade) may move the powder supply 122 from the top of the powder supply platform 129 and may spread a layer of the powder supply 122 over the build platform 130. For example, the powder supply assembly 146 may include any conventional powder supply assembly known in the art.

The heat applicator assembly 144 may include a laser 112 and a scanner 116. Laser 112 may be configured to emit an energy beam 114 which may be configured to melt a powder (e.g., a metallic powder) such that the particles of the powder melt together. In some embodiments, scanner 116 may include one or more mirrors configured to redirect the energy beam 114 such that the energy beam 114 translates over a surface of the powder disposed over the build platform 130. For example, heat applicator assembly 144 may include any conventional heat application system known in the art. In some embodiments, the heat applicator assembly may be configured to apply heat to a powder (e.g., powder supply 122 disposed over the build platform 130) without the use of scanner 116. For example, heat applicator assembly 144 may be configured to direct the laser 112, and thereby energy beam 114, to scan over a powder disposed over the build platform 130 without relying on any intervening scanners or mirrors.

After the heat applicator assembly 144 applies heat to a layer of powder, another layer of powder supply 122 may be spread over the previous layer, and the laser 112 may again be directed to scan energy beam 114 over the new layer of powder. Accordingly, this process of spreading layers and melting portions of layers according to the article's geometry may be repeated to form layers of an article and, ultimately, form the article itself.

The controller 140 may include a process map generation system. The process map generation system may include a processor, a memory, a storage device, an I/O interface, and a communication interface, which may be communicatively coupled by way of a communication infrastructure. In one or more embodiments, the processor includes hardware for executing instructions, such as those making up a computer program. The memory may be used for storing data, metadata, and programs for execution by the processor(s). The storage device includes storage for storing data or instructions. The I/O interface allows a user to provide input to, receive output from, and otherwise transfer data to and receive data from the additive manufacturing system 100. The communication interface can include hardware, software, or both. In any event, the communication interface can provide one or more interfaces for communication (such as, for example, packet-based communication) between the additive manufacturing system 100 and one or more other computing devices or networks.

In operation, the controller 140 may slice a three-dimensional model into layers via a conventional process to create a two-dimensional image of each later. Subsequently, the laser 112 and scanner 116 may direct the energy beam 114 over a thin layer of powder supply 122 that has been disposed over the build platform 130 (e.g., 0.1 mm thick layer of powder). Excess powder 126 may be disposed as over powder overflow platform 135 and powder overflow platform 135 may be configured to be translated in a downward vertical direction (e.g., along a vertical Z axis) by powder overflow piston 134 as needed. The energy beam 114 may heat portions of the powder supply 122 such that the heated portions melt together as a first layer according to the two-dimensional image of the first layer. The build platform 130 may then incrementally lower (e.g., lower by the same amount as the thickness of the layer of powder supply 122), and the process repeats until the entire (or at least a portion) of the three-dimensional model is created.

Though discussed in terms of a particular type of additive manufacturing device 110 (e.g., a laser powder bed fusion device), the additive manufacturing system 100 may include any additive manufacturing device. For instance, the additive manufacturing system 100 may include an additive manufacturing device for performing one or more of stereolithography (SLA), sol-gel or liquid dispense methods, binder jetting, inkjet 3D printing, direct metal deposition, micro plasma powder deposition, direct laser sintering, selective laser sintering, electron beam melting, electron beam freeform fabrication, fused deposition modeling, or other additive manufacturing processes.

Figure 2:
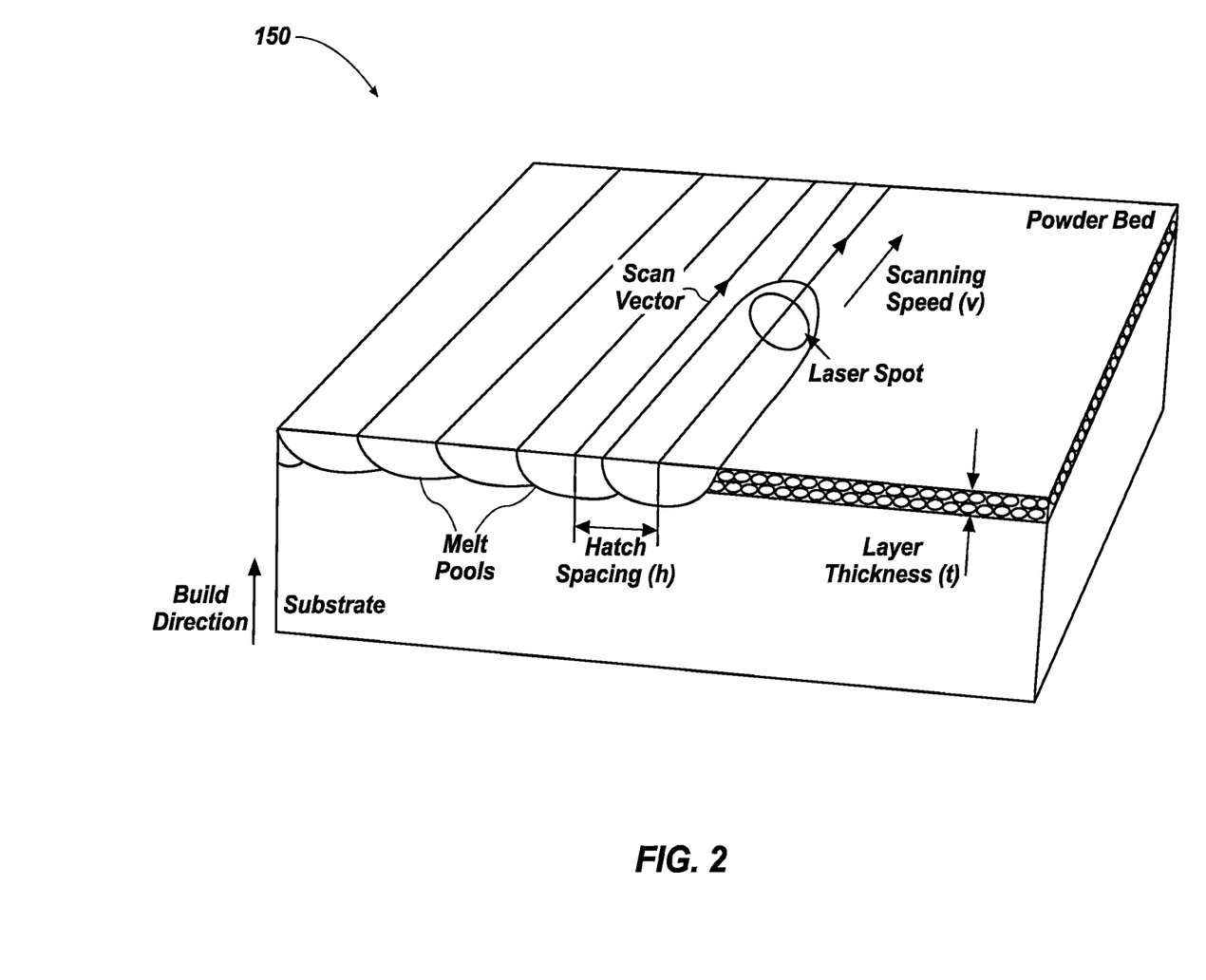
FIG. 2 is a perspective view of a diagram illustrating non-limiting examples of operating parameters for an additive manufacturing device according to one or more embodiments of the present disclosure.

FIG. 2 is a perspective view of a diagram 150 illustrating operating parameters for an additive manufacturing device (e.g., additive manufacturing device 110) according to one or more embodiments. For example, operating parameters for an additive manufacturing device may include at least one parameter selected from among the group consisting of laser power, laser scanning speed, hatch spacing, powder layer thickness, build direction, laser spot size, scan vector, powder bed composition, or melt pool size. Moreover, what operating parameters are used for an additive manufacturing device may change based on what type of process is being executed by the additive manufacturing device. For example, an additive manufacturing device configured to perform binder jetting may not include operating parameters involving a laser, but instead may include operating parameters related to the binder jetting process such as binder material, volume of material deposited over time, size of binder material applicator nozzle, etc.

Figure 3:
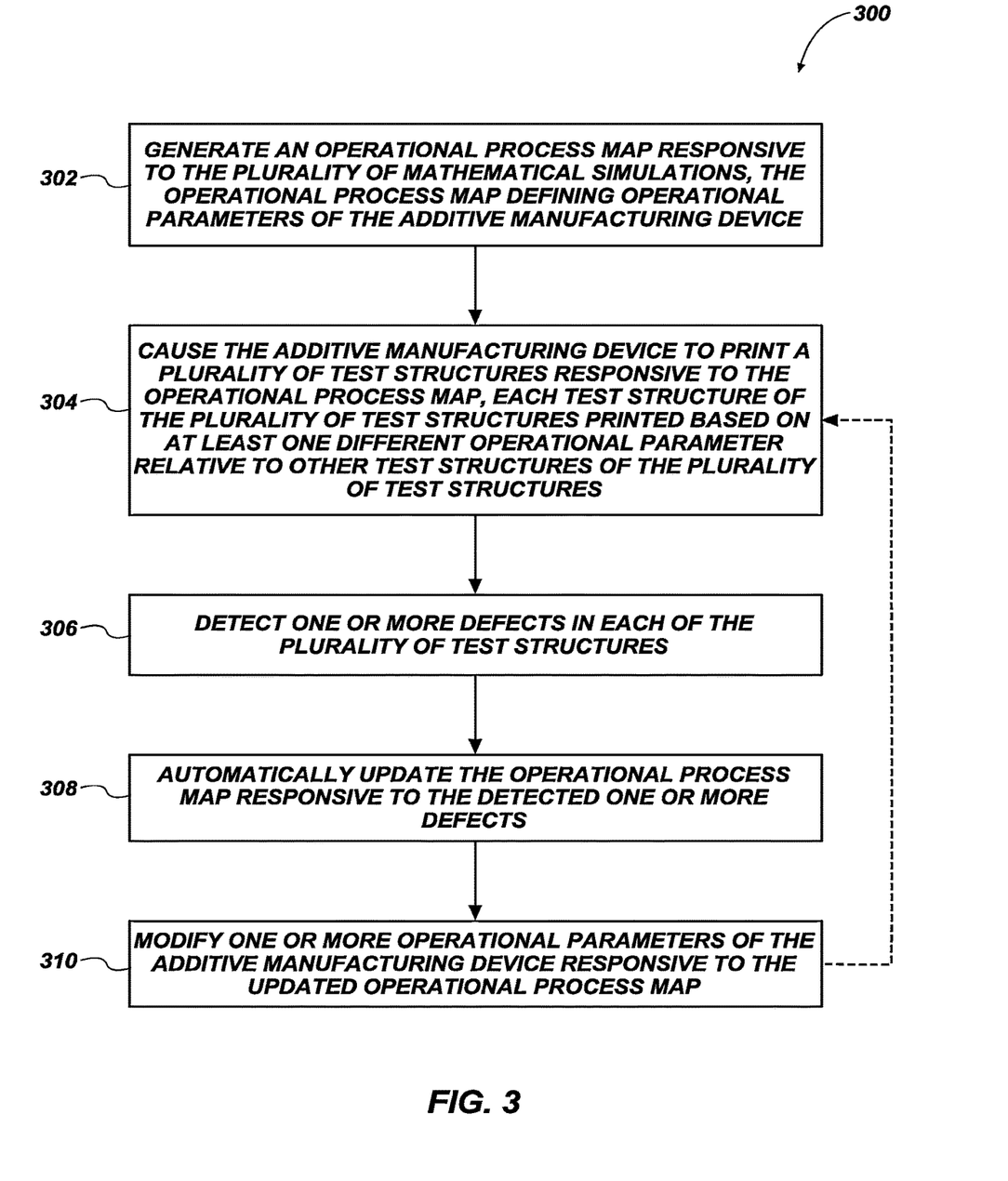
FIG. 3 is a flowchart illustrating an operation of the additive manufacturing system performed by a processor executing instructions stored on a computer-readable storage medium according to one or more embodiments of the present disclosure.

FIG. 3 is a flowchart illustrating an operation of the additive manufacturing system 100 performed by a processor executing instructions stored on a computer-readable storage medium. At operation 302, the additive manufacturing system 100 generates or otherwise obtains an operational process map responsive to a plurality of mathematical simulations where the operational process map defines one or more operating parameters of the additive manufacturing device. The plurality of mathematical simulations may include physics-based simulations of an operation of an additive manufacturing device (e.g., additive manufacturing device 110). For example, the plurality of simulations may simulate the operation of an additive manufacturing device where each simulation of the plurality of simulations varies an operating parameter of an additive manufacturing device relative to the other simulations of the plurality of simulations. Stated another way, the plurality of simulations may simulate the operation of an additive manufacturing device considering and varying one or more operating parameters for each simulation. Moreover, each simulation of the plurality of simulations may predict whether the operating parameters of a respective simulation will produce defects in an article printed using those operating parameters.

Furthermore, the plurality of simulations may be used to generate an initial operational process map that defines values in n dimensions where n is the number of operating parameters. The operational process map may define relationships between two or more operating parameters. Additionally, the operational process map may also define an optimal process zone or "sweet spot" based, at least in part, on each operating parameter of the operational process map, the optimal process zone defining a range of operating parameter values configured to reduce defects in a manufactured article (e.g., a 3D printed structure). In some embodiments, the optimal process zone may define a range of operating parameter values configured to reduce defects in a manufactured article as a function of one or more operating parameter values. For example, an operational process map may define an optimal process zone based, at least in part, on each operating parameter of the operational process map such that the optimal process zone defines an area or point on the operational process map where defects are less likely to occur considering all of the operating parameters of the operational process map. In some embodiments, the operational process map may be generated before operation of the additive manufacturing system 100. For example, one or more generic operational process maps may be generated either external to or by the additive manufacturing system 100 where the generic operational process maps may be generated based on experiment data (e.g., the plurality of simulations) related to the operation of an additive manufacturing device (e.g., additive manufacturing device 110). The additive manufacturing system 100 may then obtain (e.g., select from the one or more generic operational process maps) an initial operational process map to initialize the operating parameters of the additive manufacturing device 110. For example, an operational process map may be generated on an external device (e.g., an external computing device) and the additive manufacturing device may be configured to communicate with the external device (e.g., though a wired or wireless connection) such that the additive manufacturing device may access and obtain the operational process map from the external device.

In some embodiments, the plurality of mathematical simulations and/or an operational process map may be stored on a memory device. In some embodiments, the memory device may be remote from the additive manufacturing system. In other words, the memory device may not be integrated into the additive manufacturing system 100. For example, the memory device may be an external hard drive connected to the computing device by a cable (e.g., USB, micro USB, serial, etc.) for a wireless connection (e.g., Bluetooth, virtual local area network (VLAN), etc.). In some embodiments, the memory device may be removable storage configured to connect to the processor, such as a flash drive, a compact disc (CD), a digital versatile disk (DVD), floppy disk, etc. In some embodiments, the memory device may be an integral component of the controller 140. In some embodiments, the memory device may include a database that may be configured to store the plurality of simulations. For example, the plurality of simulations may be stored in a format that is accessible by programs within the controller 140.

At operation 304, the additive manufacturing system 100 causes the additive manufacturing device to print a plurality of test structures responsive to the operational process map where each test structure of the plurality of test structures is printed based on at least one different operating parameter relative to other test structures of the plurality of test structures. For example, in some embodiments the plurality of test structures may be printed based on operating parameters known to be near operating parameter value thresholds of a defined optimal process zone for each of the operating parameters. In this way, the additive manufacturing system 100 may print one or more test structures targeted at testing operating parameters at values that may exhibit defects.

At operation 306, the additive manufacturing system detects one or more defects in each of the plurality of test structures. For example, the additive manufacturing system may use Computed Tomography (CT) to scan each of the plurality of test structures and a machine learning model may be developed that is configured to identify and classify one or more defects in each of the structures (discussed in more detail with regard to FIGS. 5 and 6).

At operation 308, the additive manufacturing system 100 automatically updates the operational process map responsive to the one or more defects. For example, for each test structure of the plurality of test structures, detected defects for the test structure may be examined along with the operating parameters associated with the test structure. The defects are then identified and assessed for root cause analysis. Thereafter, the operational process map is updated based on the location and/or type of a defect detected for the given set of operating parameters. The root cause analysis may allow for insightful and accurate assessment of operating parameters that need to be changed to reduce the detected defects allowing for targeted and informed changes to the process map and thus improving the accuracy of the operational process map in determining operating parameters that may reduce defects in a manufactured article.

At operation 310, the additive manufacturing system 100 modifies one or more operating parameters of the additive manufacturing device (e.g., manufacturing device 110) responsive to the updated operational process map. For example, in some embodiments, the additive manufacturing system 100 may update additive manufacturing device 110 to have operating parameters found on the operational process map to be at or around the defined optimal process zone. Moreover, to further improve the operational process map, operations 304, 306, 308, and 310 may be repeated until a desirable optimal process zone within the operational process map is defined.

In some embodiments, the additive manufacturing system 100 may dynamically modify one or more operating parameters of the additive manufacturing device during a printing process responsive to the operational process map. For example, the optimal process zone may define different operating parameter values over the course of the printing process. Specifically, the operating parameters at one portion of a print (e.g., the edges of the print structure) may use different operating parameters at other portions of the print (e.g., the center of the print structure). Accordingly, as the location of the print process changes, the operating parameters may change to remain within the optimal process zone of the operational process map.

Figure 4:
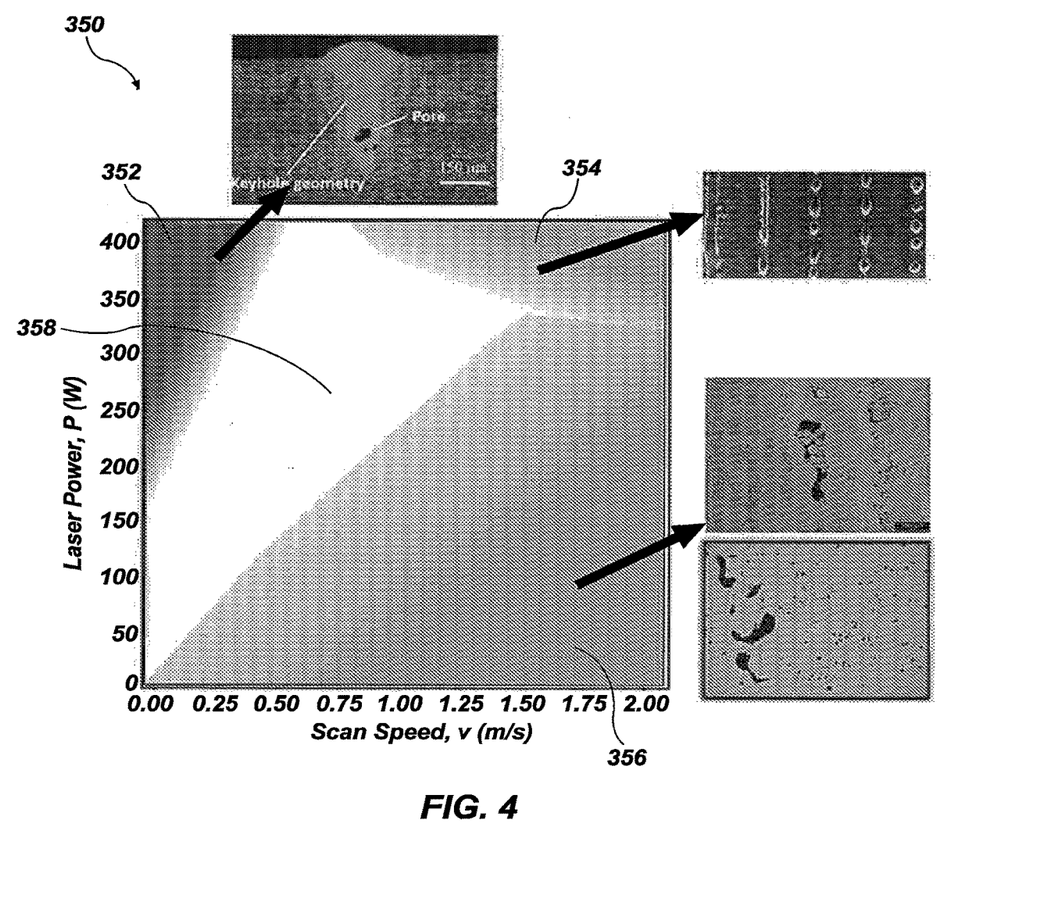
FIG. 4 shows an example operational process map according to one or more embodiments of the present disclosure.

FIG. 4 shows an example operational process map 350 defining two operating parameters: scan speed and laser power, according to one or more embodiments, relating to an AM process using a specific metal alloy (Alloy 718). The operational process map may define areas of the process map (e.g., areas 352, 354, and 356) where values of the operating parameters of the operational process map are likely to produce defects in a print build. For instance, the operational process map 350 may define map area 352 which may define operating parameter values for a scan speed variable and a laser power variable that are likely produce keyholing defects in a print build using those operating parameters. For example, as shown in FIG. 4, an additive manufacturing device with operating parameters that include a scan speed variable from about 0 m/s to about 0.5 m/s and a laser power variable from about 150 W to about 400 W may increase the likelihood of causing keyhole defects in a print build manufactured using those operating parameters. Operational process map 350 may also define a map area 354, which may define operating parameter values for a scan speed variable and a laser power variable that are likely to produce balling defects in a print build using those parameters. For example, as shown in FIG. 4, an additive manufacturing device using operating parameters that include a scan speed variable from about 0.8 m/s to about 2.0 m/s and a laser power variable from about 300 W to about 400 W may increase the likelihood of causing balling defects in a print build manufactured using those operating parameters. Furthermore, operational process map 350 may define a map area 356, which may define operating parameter values for a scan speed variable and a laser power variable that are likely to produce lack of particle fusion (e.g., vertical lack of fusion or horizontal lack of fusion) defects in a print build manufactured using those operating parameters. For instance, as shown in FIG. 4, an additive manufacturing device using operating parameters that include a scan speed variable from about 0 m/s to about 2 m/s and a laser power variable from about 0 W to about 325 W may increase the likelihood of causing lack of fusion defects in a print build manufactured using those operating parameters.

Additionally, the process map may also define a "sweet spot" (e.g., optimal operating zone 358) defining areas of the process map where the values of the operating parameters are less likely to cause defects in a print build using those operating parameters. Though shown mapping two operating parameters, an operational process map may include any number of operating parameters and, thereby, any number of dimensions. Moreover, though shown mapping three types of defects (e.g., keyholing, balling, or lack of fusion), an operational process map may define any number of defects as areas of the process map. For example, a process map may also include map areas defining an area of the process map indicative of operating parameter values likely to produce surface close porosity defects in a print build using those operating parameters. For example, surface-close porosity (also known as subsurface or near-surface porosity) often occurs around the contours (borders) and core of the print build where the laser slows down and turns around near the contours. Accordingly, additional variables such as hatch spacing may be mapped as with relation to laser speed to create a map area defining an area where the values for hatch speed and laser speed are likely to cause surface-close porosity defects in a print build using those parameters.

Furthermore, each operating parameter included in the operational process map may influence or change the areas defined by the operational process map such as, for example, the optimal operating zone 358. For instance, additional operating parameters (e.g., hatch spacing) included in operational process map 350 may cause the areas defined by the operational process map 350 (e.g., the optimal operating zone 358) to change. Moreover, the inclusion of additional operating parameters may cause the operational process map 350 to map areas for additional defects (e.g., a map area defining operating parameter values likely to produce surface closed porosity defects).

Figure 5:
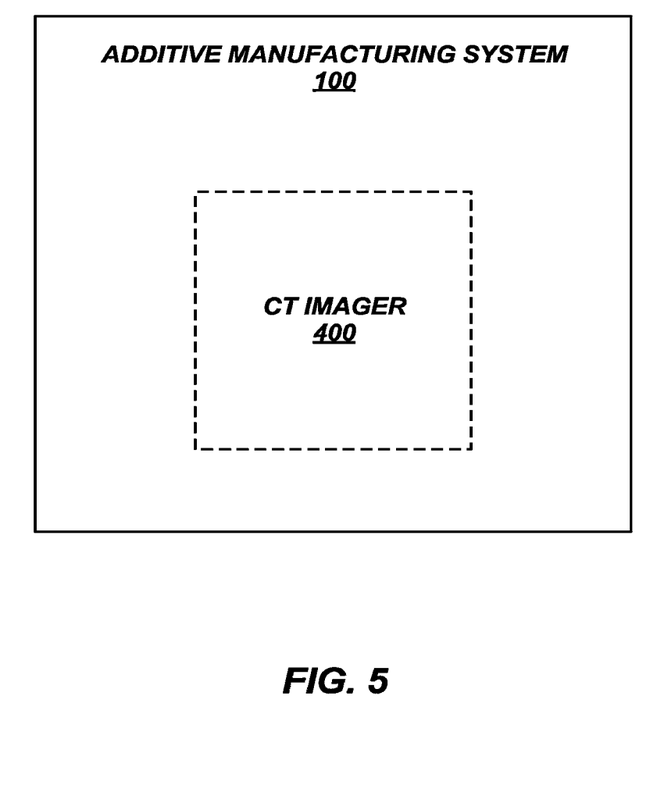
FIG. 5 shows an additive manufacturing system including a Computed Tomography (CT) imager according to one or more embodiments of the present disclosure.

FIG. 5 shows an additive manufacturing system 100 including a Computed Tomography (CT) imager 400 according to one or more embodiments of the disclosure. In some embodiments, the CT imager 400 may be configured to obtain one or more CT images of an object (e.g., a 3D printed structure).

Figure 6:
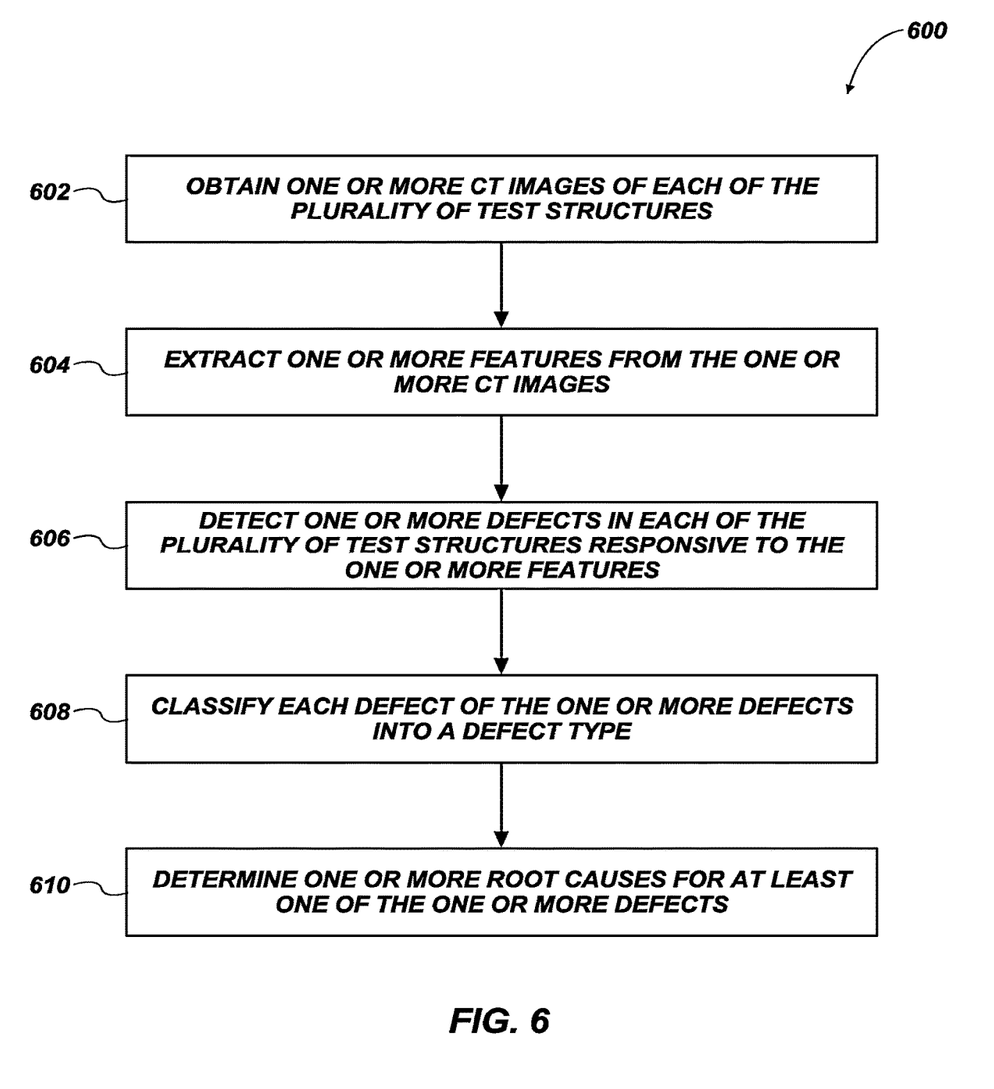
FIG. 6 is a flowchart illustrating an operation of an additive manufacturing system performed by a processor executing instructions stored on a computer-readable medium according to one or more embodiments of the present disclosure.

FIG. 6 is a flowchart illustrating an operation of the additive manufacturing system 100 performed by a processor executing instructions stored on a computer-readable medium. Referring to both FIG. 5 and FIG. 6 together, at operation 602, the additive manufacturing system 100 may obtain one or more CT images of a plurality of test structures printed by an additive manufacturing device (e.g., additive manufacturing device 110) via a CT imager (e.g., CT imager 400). One some embodiments, the one or more CT images may represent one or more 2D cross-sectional slices of the test structure being imaged. For example, in some embodiments, the CT imager 400 may be separate from the additive manufacturing device 110 and an operator may place a structure printed by the additive manufacturing device 110 within the CT imager and produce one or more CT images of the printed structure via CT imager 400. In other embodiments, the CT imager may be integrated with the additive manufacturing device 110 such that the additive manufacturing system 100 may automatically obtain one or more CT images from a structure printed by the additive manufacturing device 110 following the completion of the printing process.

In some embodiments, the additive manufacturing system may perform one or more image processing techniques to enhance features of the one or more CT images. For example, the additive manufacturing system 100 may perform at least one technique selected from among the group consisting of edge detection, histogram equalization, noise reduction, edge enhancement, image sharpening, signal boosting, or signal dampening. As a specific example, the additive manufacturing system 100 may apply any conventionally known convolution matrix to at least part of the one or more CT images to enhance features of the image, e.g., possible defects represented in the image.

At operation 604, the additive manufacturing system 100 may extract one or more features from the one or more CT images. For example, the additive manufacturing system 100 may extract features using any conventionally known feature extraction techniques such as convolution, Rectified Linear Unit transformations, pooling, etc. At operation 606, the additive manufacturing system 100 may detect one or more defects in each of the plurality of test structures responsive to the one or more features. For example the detection may include detecting the location of the defect within the structure that was the subject of CT imaging. At operation 608, the additive manufacturing system 100 may classify each defect of the one or more defects into a defect type (e.g., keyholing, balling, lack of fusion, etc.). In some embodiments, operations 606 and 608 may be performed using a machine learning model. For example, additive manufacturing system may train a classification model (e.g., a machine learning model) configured to identify a defect type and/or defect location based, at least in part, on features represented in a CT image (e.g., a CT image obtained via CT imager 400). The classification model may be trained using decision tree learning, regression trees, boosted trees, gradient boosted trees, multilayer perceptron, one-vs-rest, gradient boosted tree, k-nearest neighbor association rule learning, a neural network, deep learning, pattern recognition, or any other type of machine learning. In some embodiments the machine learning model may be trained using at least five thousand data points in the form of pores found in 3D printed structures where the pores may be greater than or equal to 100 nm in both height and width. As a specific example, one iteration of an unsupervised training process may include printing test structures using different combinations of varied parameters to create one or more defect types for a given material used in the printing process. The test structures may then be scanned by a CT imaging device (e.g., CT imager 400) to create one or more CT images of the test structures. A machine learning method (e.g., an unsupervised machine learning method such as clustering or manifold learning) may then be used to form classes of defect types based on features extracted using the machine learning method. An operator may then manually examine the test structures and/or the CT images of the test structures to confirm the accuracy of at least one defect classified by the machine learning method. A machine learning model may then be generated or updated responsive to the detected defects and/or the accuracy findings of the operator. This process may be repeated any number of times until a desirable classification model is achieved.

As another example, a classification model may be achieved through a supervised training process. For instance, one iteration of a supervised training process may include printing test structures using different combinations of varied parameters to create one or more defect types for a given material used in the printing process using a generated operational process map. The test structures may then be scanned by a CT imaging device (e.g., CT imager 400) to produce one or more CT images of the test structures. The test structures and/or the CT images may then be manually examined to identify defects and assign identified defects into classes. The identified classes may then be used to generate or train a classification model based on the identified classes and the features present in the CT images. For example, a machine learning model may be trained based on labeled classes through dimensionality reduction techniques and performing a feature selection process on the identified features in a CT image to identify distinguishing characteristics of different defect types. This process may be repeated any number of times until a desirable classification model is achieved.

In some embodiments, the classification model may be generated before the operational process map is generated. Moreover, the classification model may be continually trained during operation of the additive manufacturing system 100 with or without manual feedback.

At operation 610, the additive manufacturing system 100 may determine one or more root causes for at least one of the one or more defects. In some embodiments, the additive manufacturing system 100 may determine one or more root cause of a defect based on the location and/or type of defect detected. For example, detecting a keyhole-type defect may be indicative that the laser scanning speed is too slow and/or the laser power is too high. In some embodiments, the additive manufacturing system may generate one or more recommendations via a user interface display of the additive manufacturing system to change one or more operating parameters of the additive manufacturing device (e.g., additive manufacturing device 110) to address the defect. An operator may then take corrective actions based upon the recommendations. In some embodiments, the additive manufacturing system 100 may automatically update an operational process map (e.g., the operational process map of additive manufacturing device 110) responsive to the classified defect types and/or the one or more root causes. For example, upon detecting one or more keyhole defects, the additive manufacturing system 100 may automatically update the operational process map to define an optimal process zone defining operational parameters having a faster laser scanning speed and/or a lower laser power. Thereafter, the additive manufacturing system 100 may modify one or more operating parameters of the additive manufacturing device (e.g., manufacturing device 110) responsive to the updated operational process map.

Figure 7:
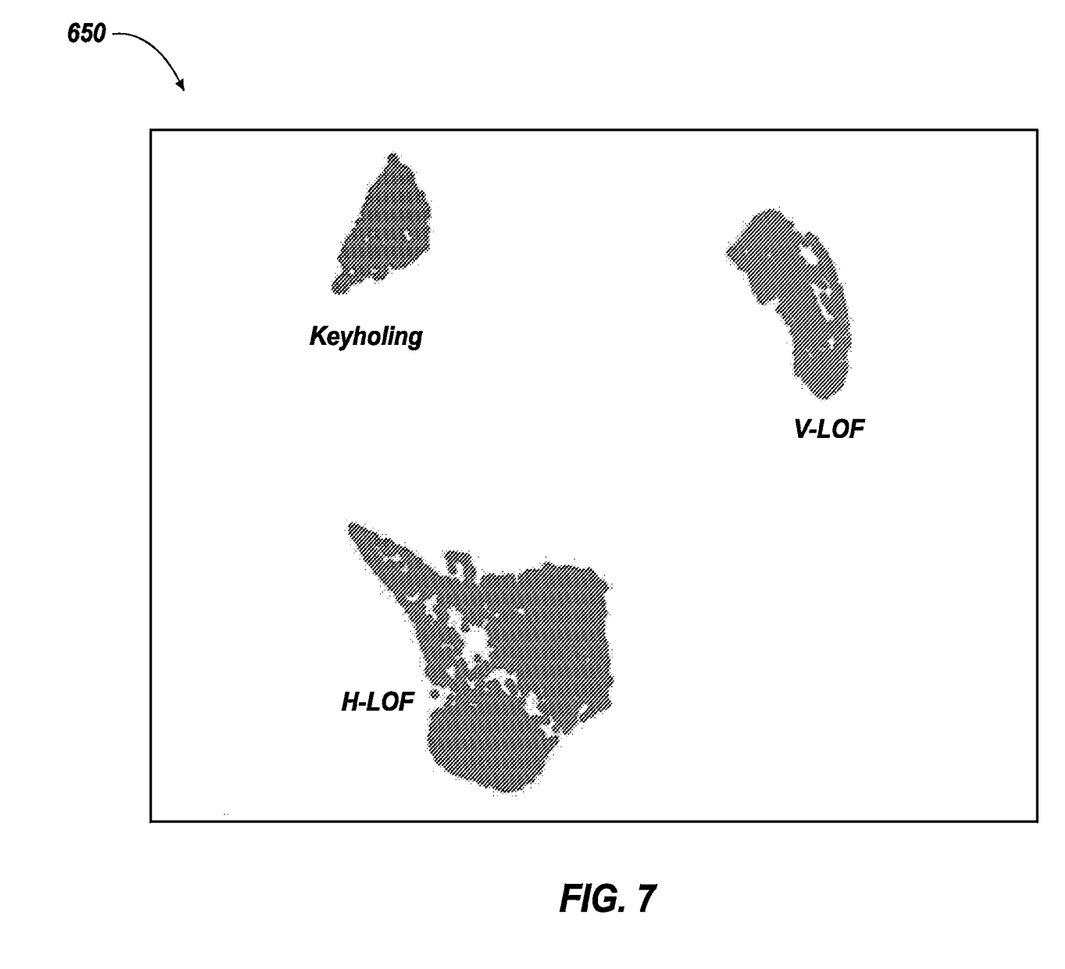
FIG. 7 is a diagram of defects that have been detected and classified via one or more operations of an additive manufacturing system described herein.

FIG. 7 is a diagram 650 of example defects that have been detected and classified via one or more operations of the additive manufacturing system 100 described herein (e.g., operation 600). As shown in FIG. 7, the additive manufacturing system 100 may detect defects such as keyholing, vertical lack of fusion (V-LOF), and horizontal lack of fusion (H-LOF) within a CT image and classify the detected defects into defect types based on detected features commonly indicative of defect type using a machine learning model. By doing this, defects can be quickly identified and classified by defect type, which may enable easier assessment of the root cause for the defects in comparison to conventional techniques which may require manual identification of defect types in order to make desired changes to operating parameters of an additive manufacturing device.

Referring to FIGS. 1-7 together, developing operating parameters of the additive manufacturing system 100 by automatically updating an operational process map for the additive manufacturing device 110 may be advantageous over conventional methods of developing operating parameters for additive manufacturing devices. For example, the methods described herein may enable greatly improved efficiency in developing operating parameters for an additive manufacturing device while also allowing for the development of more comprehensive, and therefore more accurate, operational process map. For example, the methods described herein allow for automatic updating of an operational process map of an additive manufacturing device based on detected defects, which may allow for greater efficiency in developing operating parameters for an additive manufacturing device.

Moreover, the methods described herein may allow for more insightful and targeted experiments when developing test structures for operational process map development. For instance, the methods described herein may enable for a machine learning approach to detection and identification of defects within 3D print structures. This may allow for automatic updating of an operational process map as well as providing accelerated and more accurate root cause analysis, which may allow for more targeted and insightful operating parameter adjustments for each 3D print iteration, thereby lowering the required number of 3D print iterations. Moreover, the machine learning based classification described in the methods herein may allow for increased scalability to include different materials and additive manufacturing processes as well as the ability to detect additional additive manufacturing defect types.

Figure 8:
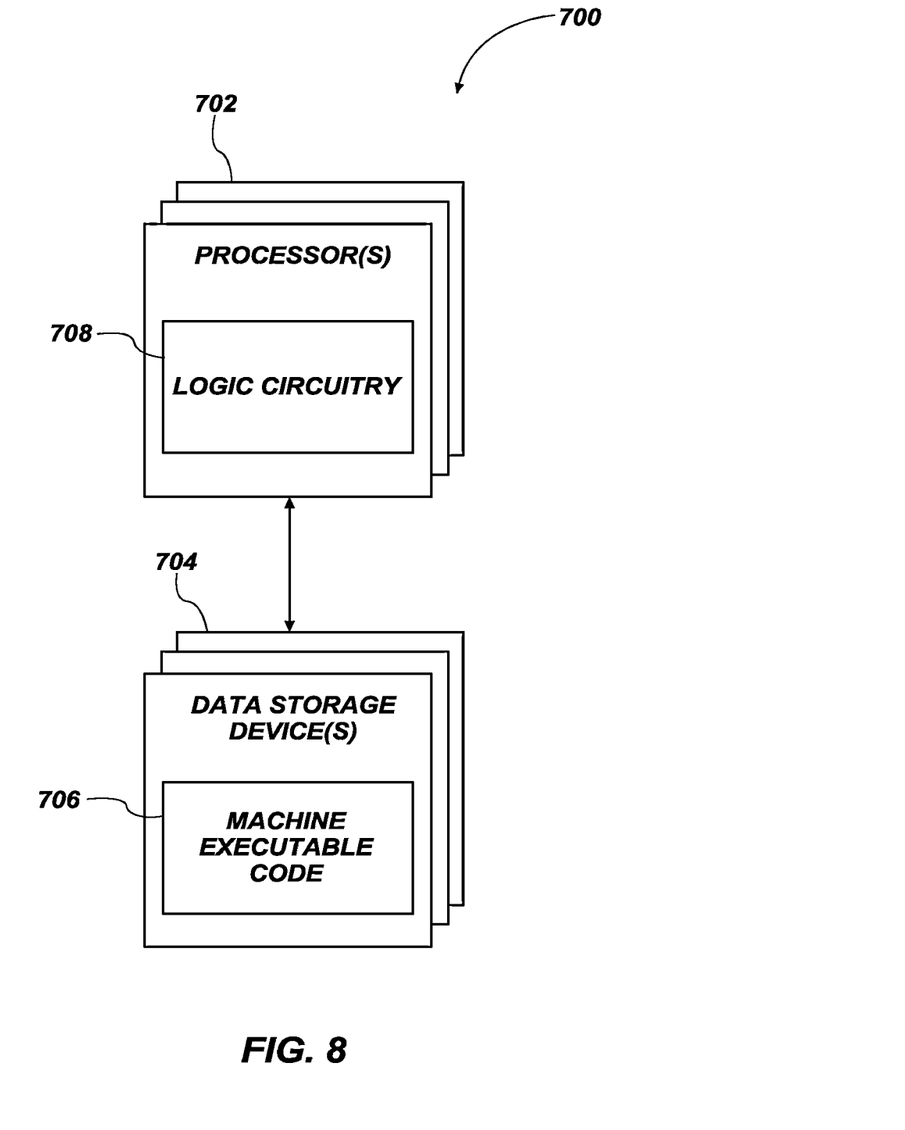
FIG. 8 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 8 illustrates non-limiting examples of implementations of functional elements disclosed herein. In some examples, some or all portions of the functional elements disclosed herein may be performed by hardware specially configured for carrying out the functional elements.

FIG. 8 is a block diagram of circuitry 700 that, in some examples, may be used to implement various functions, operations, acts, processes, and/or methods disclosed herein. The circuitry 700 includes one or more processors 702 (sometimes referred to herein as "processors 702") operably coupled to one or more data storage devices (sometimes referred to herein as "storage 704"). The storage 704 includes machine executable code 706 stored thereon and the processors 702 include logic circuitry 708. The machine executable code 706 includes information describing functional elements that may be implemented by (e.g., performed by) the logic circuitry 708. The logic circuitry 708 is adapted to implement (e.g., perform) the functional elements described by the machine executable code 706. The circuitry 700, when executing the functional elements described by the machine executable code 706, should be considered as special purpose hardware configured for carrying out functional elements disclosed herein. In some examples the processors 702 may perform the functional elements described by the machine executable code 706 sequentially, concurrently (e.g., on one or more different hardware platforms), or in one or more parallel process streams.

When implemented by logic circuitry 708 of the processors 702, the machine executable code 706 is configured to adapt the processors 702 to perform operations of examples disclosed herein. For example, the machine executable code 706 may adapt the processors 702 to perform at least a portion or a totality of the operation 300 of FIG. 3 and/or the operation 600 of FIG. 6. As another example, the machine executable code 706 may adapt the processors 702 to perform at least a portion or a totality of the operations discussed for the system of FIG. 1. As a specific, non-limiting example, the machine executable code 706 may adapt the processors 702 to generate or otherwise obtain an operational process map responsive to a plurality of mathematical simulations stored on a non-transitory storage device. As another specific, non-limiting example, the machine executable code 706 may adapt the processors 702 to detect one or more defects in each of the plurality of test structures, automatically update an operational process map responsive to the detected one or more defects, and modify one or more operational parameters of an additive manufacturing device responsive to the operational process map. As yet another specific, non-limiting example, the machine executable code 706 may adapted processors 702 to train a machine learning model based one or more input CT images. As yet another specific-non-limiting example, the machine executable code 706 may adapt processors 702 to receive one or more CT images, extract one or more features from the one or more CT images, detect one or more defects in each of the plurality of test structures using a machine learning-developed model, classify the detected defects using the machine learning developed model, and determine one or more root causes for at least one of the one or more defects.

The processors 702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine executable code 706 (e.g., software code, firmware code, hardware descriptions) related to examples of the present disclosure. It is noted that a general-purpose processor (may also be referred to herein as a host processor or simply a host) may be a microprocessor, but in the alternative, the processors 702 may include any conventional processor, controller, microcontroller, or state machine. The processors 702 may also be implemented as a combination of computing devices, such as a combination of a DSP and a microprocessor, a plurality of microprocessors, one or more microprocessors in conjunction with a DSP core, or any other such configuration.

In some examples the storage 704 includes volatile data storage (e.g., random-access memory (RAM)), non-volatile data storage (e.g., Flash memory, a hard disc drive, a solid state drive, erasable programmable read-only memory (EPROM), etc.). In some examples the processors 702 and the storage 704 may be implemented into a single device (e.g., a semiconductor device product, a system on chip (SOC), etc.). In some examples the processors 702 and the storage 704 may be implemented into separate devices.

In some examples the machine executable code 706 may include computer-readable instructions (e.g., software code, firmware code). By way of non-limiting example, the computer-readable instructions may be stored by the storage 704, accessed directly by the processors 702, and executed by the processors 702 using at least the logic circuitry 708. Also by way of non-limiting example, the computer-readable instructions may be stored on the storage 704, transferred to a memory device (not shown) for execution, and executed by the processors 702 using at least the logic circuitry 708. Accordingly, in some examples the logic circuitry 708 includes electrically configurable logic circuitry 708.

In some examples the machine executable code 706 may describe hardware (e.g., circuitry) to be implemented in the logic circuitry 708 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description may be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine executable code 706 may include an HDL, an RTL, a GL description, a mask level description, other hardware description, or any combination thereof.

In examples where the machine executable code 706 includes a hardware description (at any level of abstraction), a system (not shown, but including the storage 704) may implement the hardware description described by the machine executable code 706. By way of non-limiting example, the processors 702 may include a programmable logic device (e.g., an FPGA or a PLC) and the logic circuitry 708 may be electrically controlled to implement circuitry corresponding to the hardware description into the logic circuitry 708. Also by way of non-limiting example, the logic circuitry 708 may include hard-wired logic manufactured by a manufacturing system (not shown, but including the storage 704) according to the hardware description of the machine executable code 706.

Regardless of whether the machine executable code 706 includes computer-readable instructions or a hardware description, the logic circuitry 708 is adapted to perform the functional elements described by the machine executable code 706 when implementing the functional elements of the machine executable code 706. It is noted that although a hardware description may not directly describe functional elements, a hardware description indirectly describes functional elements that the hardware elements described by the hardware description are capable of performing.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An additive manufacturing system, comprising:
    an additive manufacturing device; and
    a process map generation system comprising:
        at least one processor;
        at least one non-transitory computer-readable storage medium storing instructions thereon that, when executed by the at least one processor cause the process map generation system to:
            obtain an operational process map defining operating parameters of the additive manufacturing device;
            cause the additive manufacturing device to print a plurality of test structures responsive to the operational process map, each test structure of the plurality of test structures printed based on at least one different operating parameter relative to other test structures of the plurality of test structures;
            detect one or more defects in each of the plurality of test structures;
            automatically update the operational process map responsive to the one or more defects; and
            modify one or more operating parameters of the additive manufacturing device responsive to the operational process map.

2. The additive manufacturing system of claim 1, wherein the one or more defects include at least one defect selected from among the group consisting of key holing, vertical lack of fusion, horizontal lack of fusion, balling, or surface closed porosity.

3. The additive manufacturing system of claim 1, wherein the operating parameters include at least one parameter selected from among the group consisting of laser power, laser scanning speed, hatch spacing, powder layer thickness, build direction, laser spot size, scan vector, powder bed composition, or melt pool size.

4. The additive manufacturing system of claim 1, wherein the operational process map defines an optimal process zone based, at least in part, on each operating parameter of the operational process map, the optimal process zone defining a range of operating parameter values configured to reduce defects in structures printed by the additive manufacturing device.

5. The additive manufacturing system of claim 1, further comprising a computed tomography (CT) imager, wherein the instructions stored on the at least one non-transitory computer-readable storage medium, when executed by the processor, cause the process map generation system to:
    obtain one or more CT images of each of the plurality of test structures via the CT imager;
    extract one or more features from the one or more CT images;
    detect one or more defects in each of the plurality of test structures responsive to the one or more features and
    classify each defect of the one or more defects into a defect type.

6. The additive manufacturing system of claim 5, wherein the instructions stored on the at least one non-transitory computer-readable storage medium, when executed by the processor, cause the process map generation system to:
    determine one or more root causes for at least one of the one or more defects; and
    automatically update the operational process map responsive to classified defect types and the one or more root causes.

7. The additive manufacturing system of claim 5, wherein the instructions stored on the at least one non-transitory computer-readable storage medium, when executed by the processor, cause the process map generation system to:
    train a classification model configured to identify a defect type and/or defect location based, at least in part, on features represented in a CT image.

8. The additive manufacturing system of claim 1, further comprising:
    a memory device storing data representative of experiment data related to a process of the additive manufacturing device;
    wherein the instructions stored on the at least one non-transitory computer-readable storage medium, when executed by the processor, cause the process map generation system to:
    generate an operational process map responsive to the experiment data.

9. The additive manufacturing system of claim 1, further comprising a plurality of mathematical simulations, the plurality of mathematical simulations being physics-based simulations of an operation of the additive manufacturing device.

10. A method for determining operating parameters of an additive manufacturing device, comprising:

generating an operational process map based on a plurality of pre-calculated mathematical simulations of an operation of an additive manufacturing device;

printing a plurality of test structures via the additive manufacturing device, each test structure of the plurality of test structures printed using at least one different operating parameter relative to other test structures of the plurality of test structures;

detecting one or more defects in each test structure of the plurality of test structures;

automatically updating the operational process map responsive to the one or more defects; and modifying one or more operating parameters of the additive manufacturing device responsive to the updated operational process map.

11. The method of claim 10, wherein detecting one or more defects in each test structure of the plurality of test structures comprises:

obtaining one or more Computed Tomography (CT) images of each of the plurality of test structures via the CT imager;

extracting one or more features from the one or more CT images;

detecting one or more defects in each of the plurality of test structures responsive to the one or more features; and classifying each defect of the one or more defects into a defect type.

12. The method of claim 11, further comprising performing one or more image processing techniques on the one or more CT images.

13. The method of claim 12, further comprising selecting the one or more image processing techniques to include at least one technique selected from among the group consisting of edge detection, histogram equalization, noise reduction, edge enhancement, image sharpening, signal boosting, or signal damping.

14. The method of claim 11, further comprising training a classification model configured to identify a defect type and/or defect location based, at least in part, on features represented in a CT image.

15. The method of claim 11, further comprising automatically updating the operational process map responsive to classified defect types.

16. The method of claim 10, further comprising detecting the one or more defects from among the group consisting of key holing, vertical lack of fusion, horizontal lack of fusion, balling, or surface closed porosity.

17. The method of claim 10, modifying the one or more operating parameters includes modifying at least one parameter selected from the group consisting of laser power, laser scanning speed, hatch spacing, powder layer thickness, build direction, laser spot size, scan vector, powder bed composition, or melt pool size.

18. The method of claim 10, further comprising configuring the operational process map to define an optimal process zone based, at least in part, on each operating parameter of the operational process map, the optimal process zone defining a range of operating parameter values configured to reduce defects in structures printed by the additive manufacturing device.

19. A non-transitory computer-readable medium storing instructions thereon that, when executed by at least one processor, cause the at least one processor to perform the steps comprising:

generating an operational process map based on a plurality of pre-calculated mathematical simulations of an operation of an additive manufacturing device;

printing a plurality of test structures via the additive manufacturing device, each test structure of the plurality of test structures printed using at least one different operating parameter relative to other test structures of the plurality of test structures;

obtaining one or more Computed Tomography (CT) images of each of the plurality of test structures via a CT imager;

extracting one or more features from the one or more CT images;

classifying one or more defects represented in the CT images into one or more defect types based, at least in part, on one or more features;

automatically updating the operational process map responsive to the one or more defect types; and modifying one or more operating parameters of the additive manufacturing device responsive to the operational process map.

20. The non-transitory computer-readable medium of claim 19, further comprising dynamically modifying one or more operating parameters of the additive manufacturing device during a printing process responsive to the operational process map.

* * * * *